United States Patent
Pickhardt

(10) Patent No.: US 10,637,031 B2
(45) Date of Patent: Apr. 28, 2020

(54) CELL CONNECTOR, METHOD FOR PRODUCING SAME AND BATTERY MODULE

(71) Applicant: Robert Bosch GmbH, Stuttgart (DE)

(72) Inventor: Moritz Pickhardt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 15/949,506

(22) Filed: Apr. 10, 2018

(65) Prior Publication Data

US 2018/0294462 A1   Oct. 11, 2018

(30) Foreign Application Priority Data

Apr. 11, 2017   (DE) ........................ 10 2017 206 158

(51) Int. Cl.
 *H01M 2/30* (2006.01)
 *H01M 2/20* (2006.01)
 *H01R 11/01* (2006.01)
(52) U.S. Cl.
 CPC ............ *H01M 2/202* (2013.01); *H01R 11/01* (2013.01)
(58) Field of Classification Search
 CPC .................................. H01M 2/202; H01M 2/30
 See application file for complete search history.

(56) References Cited

U.S. PATENT DOCUMENTS

2012/0100761 A1* 4/2012 Groe .................... H01M 2/202
                                                                   439/774

FOREIGN PATENT DOCUMENTS

DE     102012100862 A1    8/2013
DE     102013212348 A1    12/2014
DE     102015007615 A1    12/2016

* cited by examiner

*Primary Examiner* — Olatunji A Godo
(74) *Attorney, Agent, or Firm* — Michael Best & Friedrich LLP

(57) ABSTRACT

A cell connector of a battery module comprising a first connecting region (31) formed for electrically conductive connection to a connection terminal (2) of a first battery cell and a second connecting region (32) formed for electrically conductive connection to a connection terminal (2) of a second battery cell, wherein the cell connector (1) has at least one first layer element (41) and one second layer element (42), and a first second surface (412) of the first layer element (41) and a second first surface (421) of the second layer element (42) are connected to one another, wherein the first layer element (41) has a first opening (51) formed to run continuously through the first layer element (41) and the second layer element (42) limits the depth of the first opening (51).

18 Claims, 3 Drawing Sheets

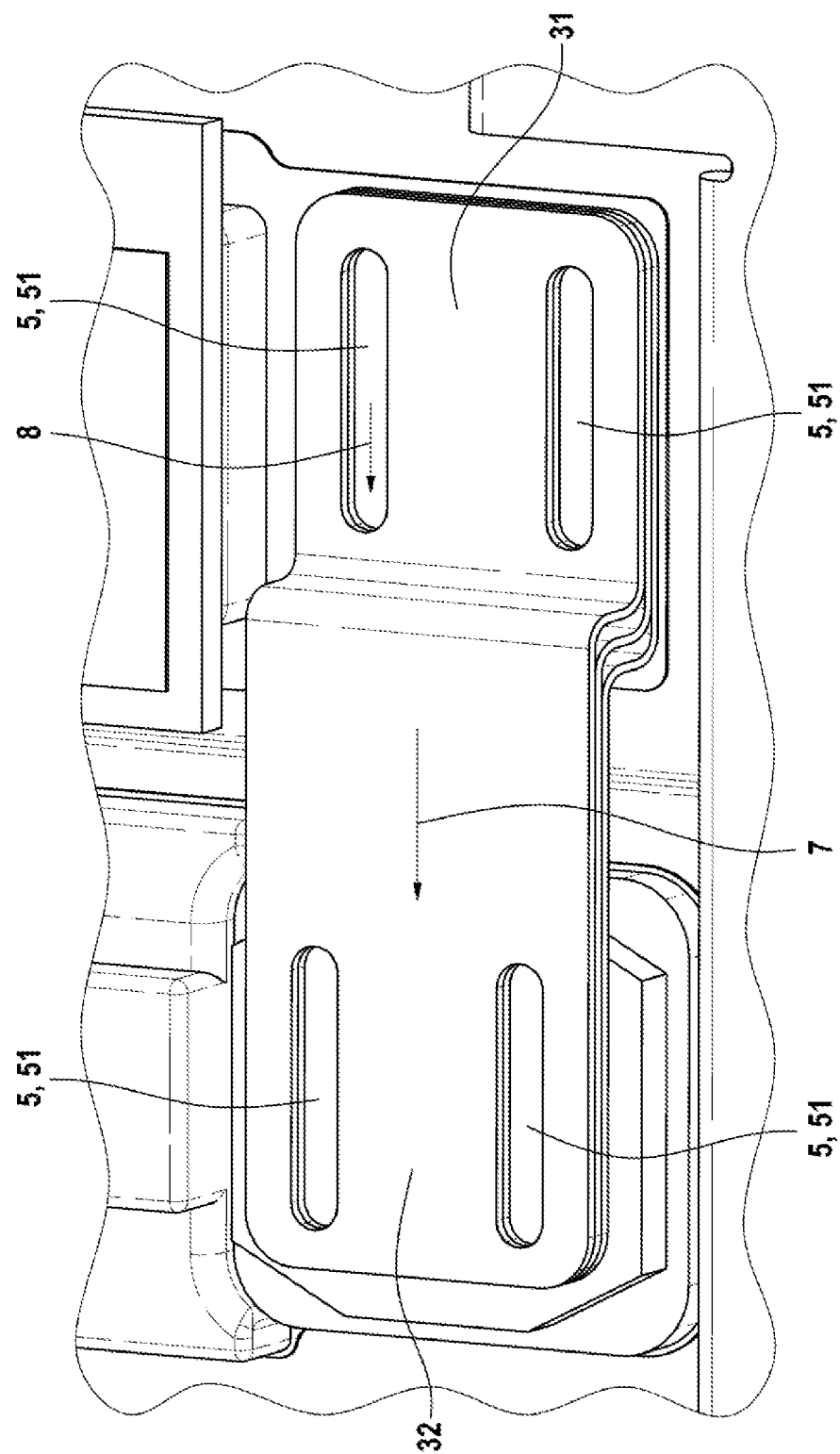

CELL CONNECTOR, METHOD FOR PRODUCING SAME AND BATTERY MODULE

BACKGROUND OF THE INVENTION

The invention proceeds from a cell connector of a battery module comprising a first connecting region formed for electrically conductive connection to a connection terminal of a first battery cell and a second connecting region formed for electrically conductive connection to a connection terminal of a second battery cell, wherein the cell connector has at least one first layer element and one second layer element, and a second surface of the first layer element and a first surface of the second layer element are connected to one another. Furthermore, the invention also relates to a method for producing a cell connector of this kind. The subject matter of the present invention is also a battery module comprising a cell connector of this kind.

It is known from the prior art that batteries, in particular batteries of electric and hybrid vehicles, as well as lithium-ion batteries, in particular, consist of at least one battery module or advantageously also of a plurality of battery modules.

Furthermore, a battery module preferably has a multiplicity of individual battery cells, which are interconnected between themselves with the battery module, wherein the individual battery cells can be electrically interconnected with one another in series and/or in parallel by means of cell connectors.

In this case, cell connectors preferably formed from aluminum connect connection terminals of two battery cells to one another.

Relative movements between individual battery cells of the battery module and hence also between the connection terminals thereof on account of shock loads acting on the battery module as well as on account of volume changes of the housings of individual battery cells, referred to as swelling, induce internal mechanical stresses in the cell connector or stresses at the connection location between the cell connector and the respective connection terminal, which, over the lifetime of a battery module, can lead to safety-critical fatigue fractures in the cell connector.

In this case, it is known from the prior art that the cell connector may comprise a compensation region, for example having a wave shape, or also that the cell connector is formed from a plurality of individual films.

On the one hand, in this case, cell connectors are embodied to be as thin as possible in order to produce a material-bonded connection between the connection terminal of the battery cell and the cell connector with the lowest possible energy input and thus to be able to minimize the heat input into the battery cell. In this case, connections of this kind are typically produced using laser welding.

On the other hand, cell connectors require a sufficient current-carrying cross section for the conduction of the electric current between two voltage taps of different battery cells.

In known solutions, these two demands on a cell connector can in this case often conflict with one another.

SUMMARY OF THE INVENTION

The cell connector of a battery module having the features of the invention has the advantage that it is possible to provide a cell connector that, on the one hand, can be formed to be so thin in regions that a reliable connection to a connection terminal of a battery cell can be formed and that, on the other hand, provides a sufficient cross section for the conduction of the electric current.

According to the invention, a cell connector of a battery module is provided for this purpose.

In this case, the cell connector has a first connecting region formed for electrically conductive connection to a connection terminal of a first battery cell.

In this case, the cell connector has a second connecting region formed for electrically conductive connection to a connection terminal of a second battery cell.

Furthermore, the cell connector has at least one first layer element and one second layer element.

In this case, a second surface of the first layer element and a first surface of the second layer element are connected to one another.

Furthermore, the first layer element has a first opening formed to run continuously through the first layer element, wherein the second layer element limits the depth of the first opening.

Advantageous developments and improvements of the apparatuses are possible by way of the measures listed in the dependent claims.

Advantageously, the cell connector furthermore has a third layer element.

In this case, a first surface of the first layer element and a second surface of the third layer element are connected to one another.

In this case, the third layer element has a third opening formed to run continuously through the third layer element.

Here, the first opening and the third opening form a joint opening formed to run continuously through the first layer element and the third layer element.

This has the advantage that it is possible to provide a cell connector that has a plurality of layer elements respectively having one or more openings.

Advantageously, the cell connector furthermore has a fourth layer element.

In this case, a second surface of the second layer element and a first surface of the fourth layer element are connected to one another.

This has the advantage that it is possible to provide a cell connector that has a plurality of layer elements respectively formed without an opening.

Overall, the two advantageous designs, which have just been described, of the cell connector comprising a third layer element having a third opening and/or a fourth layer element formed without an opening can be used here to form a cell connector that can be produced from a plurality of layer elements.

To produce a material-bonded connection between the cell connector or the respective connecting region of the cell connector and the connection terminal of a battery cell, for example, by means of a laser, said cell connector can penetrate into the formed opening and connect the layer elements formed without an opening to the connection terminal of the battery cell.

As a result thereof, it is possible to significantly reduce the energy input.

In particular, the layer elements of the cell connector can also be connected in a material-bonded manner, in particular in a laser-welded manner, to one another before the cell connector is connected in a material-bonded manner to the connection terminal of a battery cell.

Furthermore, the cell connector can in this case also be produced from a plurality of layer elements formed comparatively thinly, as a result of which the cell connector has sufficient flexibility for compensating for relative movements between the individual battery cells.

Nevertheless, a cell connector of this kind also has at the same time a sufficient cross section for the conduction of the electric current between two battery cells.

In addition, inherent stresses can be reduced on account of the flexible design and the design composed of a plurality of layer elements.

It is expedient if the first layer element and/or the second layer element are formed from a material that comprises aluminum, that comprises copper or that comprises nickel.

In particular, the material can also comprise a mixture of aluminum, copper and nickel.

Furthermore, it is also expedient if the third layer element and/or the fourth layer element are formed from a material that comprises aluminum, that comprises copper or that comprises nickel.

In particular, the material can also comprise a mixture of aluminum, copper and nickel.

According to a preferred concept of the invention, the first layer element and/or the second layer element each have a thickness of 0.5 mm to 2 mm.

According to a preferred concept of the invention as well, the third layer element and/or the fourth layer element each have a thickness of 0.5 mm to 2 mm.

In particular, the first layer element and/or the second layer element are each formed as a sheet or as a film.

In particular, the third layer element and/or the fourth layer element are each formed as a sheet or as a film.

Such cell connectors according to the invention offer the advantage that the layer elements can be formed to be thin in such a way that, as already described, a reliable material-bonded connection of the cell connector to a connection terminal of a battery cell is possible and the heat input upon placement into the battery cell is as low as possible and that the cell connector is formed in a sufficiently flexible manner.

According to an advantageous embodiment, the first layer element and the second layer element are connected in a material-bonded manner to one another, wherein said connection is formed, in particular, in a welded manner.

In particular, the first layer element and the third layer element are also additionally connected in a material-bonded manner to one another, wherein said connection is formed, in particular, in a welded manner.

In particular, the second layer element and the fourth layer element are also additionally connected in a material-bonded manner to one another, wherein said connection is formed, in particular, in a welded manner.

As a result thereof, a reliable connection of the respective layer elements with a sufficient electrical conductivity of the cell connector can be provided.

It is expedient if the first connecting region and/or the second connecting region each have a first opening. In particular, the first connecting region and/or the second connecting region each have two first opening.

As a result thereof, it is particularly possible to influence the current distribution within the cell connector through the arrangement of the first openings relative to one another.

The cell connector has a longitudinal direction pointing from the first connecting region to the second connecting region.

In this case, the first opening has a longitudinal direction pointing in the direction of the greatest extent of the first opening.

In particular, the depth is not the greatest extent of the first opening here.

Advantageously, the longitudinal direction of the first opening and the longitudinal direction of the cell connector are arranged in parallel with one another here.

A design of this kind offers the advantage of homogeneous distribution of the electric current flowing through the cell connector.

Furthermore, the invention also relates to a method for producing a cell connector.

Here, in a first method step, a first layer element and a second layer element are provided.

In a second method step, a second surface of the first layer element and a second first surface of the second layer element are then connected to one another.

In a third method step, a first opening running continuously through the first layer element is then formed in such a way that the second layer element limits the depth of the first opening.

Furthermore, the invention also relates to a further method for producing a cell connector.

Here, in a first method step, a first layer element and a second layer element are provided.

In a second method step, a first opening running continuously through the first layer element is then formed.

In a third method step, a second surface of the first layer element and a first surface of the second layer element are then connected to one another in such a way that the second layer element limits the depth of the first opening.

The two methods presented differ, in particular, in terms of the order of the execution of the method steps.

On the one hand, the connection of the first layer element to the second layer element can be produced before the formation of the first opening and, on the other hand, the connection of the first layer element to the second layer element can be produced after the formation of the first opening.

The subject matter of the present invention is also a battery module comprising a cell connector according to the invention.

The battery module comprises a first battery cell comprising a connection terminal and a second battery cell comprising a connection terminal.

In this case, the first connecting region of the cell connector is electrically conductively connected to the connection terminal of the first battery cell.

In this case, the second connecting region of the cell connector is electrically conductively connected to the connection terminal of the second battery cell.

In addition, the invention also relates to a battery comprising a battery module according to the invention.

A battery of this kind can be used, for example, in electric vehicles, plug-in hybrid vehicles, mobile electronic appliances or also in stationary storage means.

BRIEF DESCRIPTION OF THE DRAWINGS

Embodiments of the invention are illustrated in the drawings and are described in greater detail in the following description.

In the figures

FIG. 2 shows a schematic sectional view from the side of an embodiment according to the invention of a cell connector that is connected to a connection terminal of a battery cell and FIG. 3 shows a perspective illustration of a further cell connector according to the invention that electrically conductively connects two connection terminals of two different battery cells to one another.

DETAILED DESCRIPTION

Figure 1:
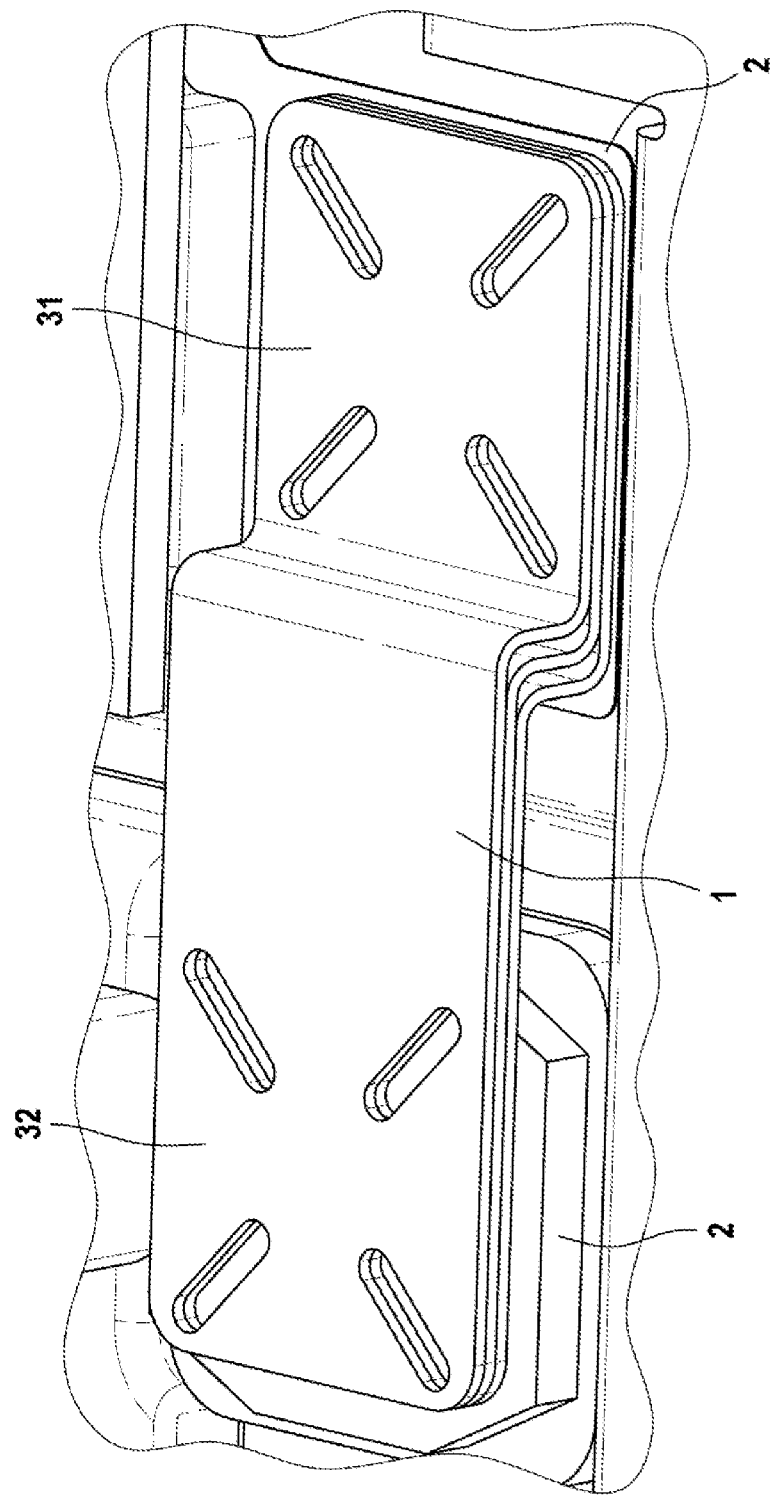
FIG. 1 shows a perspective illustration of a cell connector according to the invention that electrically conductively connects two connection terminals of two different battery cells to one another.

FIG. 1 shows a schematic illustration of a cell connector 1 that electrically conductively connects two connection terminals 2 of different battery cells to one another.

Here, the cell connector 1 has a first connecting region 31, which is formed for electrically conductive connection to the connection terminal 2 of a first battery cell, which cannot be seen in FIG. 1.

Here, the cell connector 1 has a second connecting region 32, which is formed for electrically conductive connection to the connection terminal 2 of a second battery cell, which cannot be seen in FIG. 1.

The design of a cell connector 1 according to the invention will now be described in detail with reference to FIG. 2.

Figure 2:
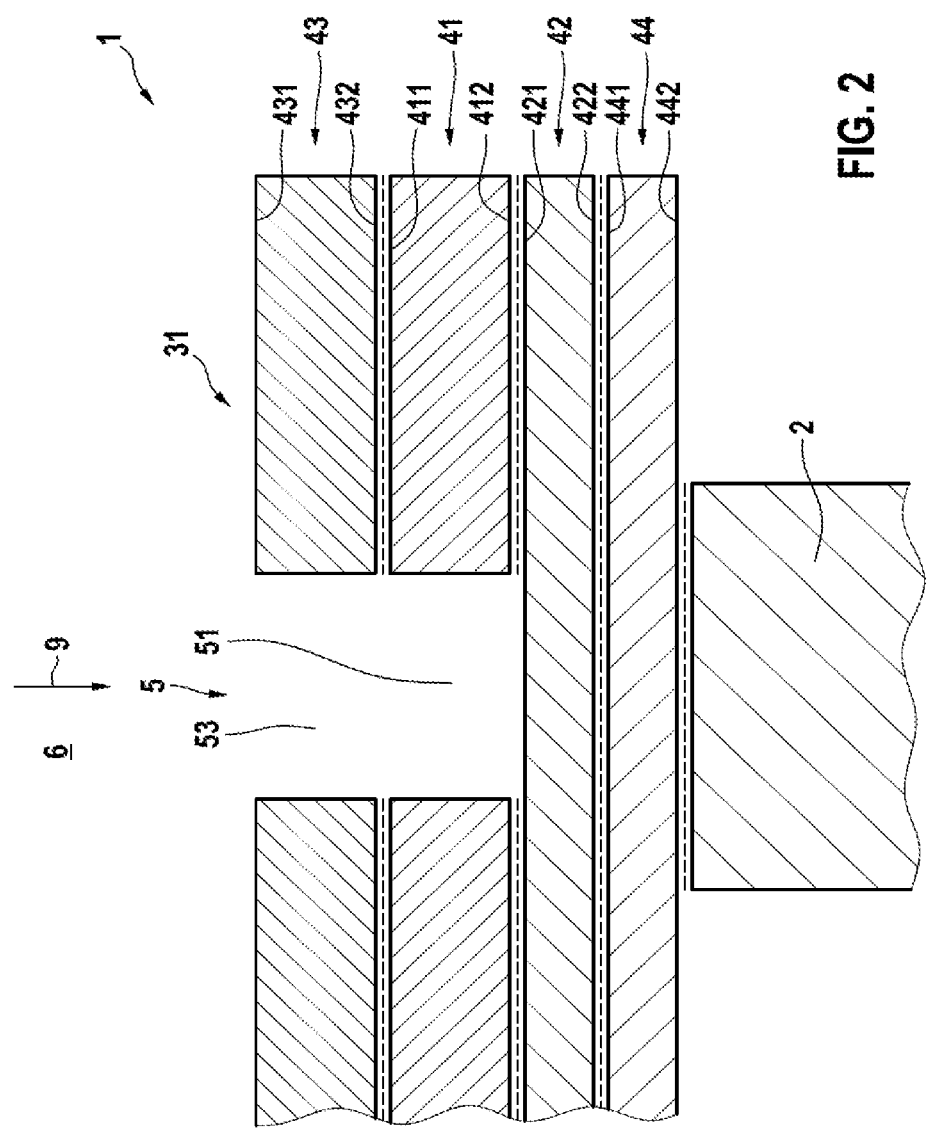

FIG. 2 shows a schematic sectional view from the side of an embodiment according to the invention of a cell connector 1 that is electrically conductively connected to the connection terminal 2 of a battery cell (not shown in FIG. 1).

Here, FIG. 2 shows, in particular, the first connecting region 31 of the cell connector 1.

The cell connector 1 has a first layer element 41.

The first layer element 41 has a first surface 411 and a second surface 412.

The cell connector 1 has a second layer element 42.

The second layer element 42 has a first surface 421 and a second surface 422.

The cell connector 1 has a third layer element 43.

The third layer element 43 has a first surface 431 and a second surface 432.

The cell connector 1 has a fourth layer element 44.

The fourth layer element 44 has a first surface 441 and a second surface 442.

The cell connector 1 is formed here in such a way that, in a respective layer element 41, 42, 43, 44, the respective first surface 411, 421, 431, 441 and the respective second surface 412, 422, 432, 442 are arranged opposite one another.

In this case, the second surface 412 of the first layer element 41 and the first surface 421 of the second layer element 42 are connected to one another.

In this case, the first surface 411 of the first layer element 41 and the second surface 432 of the third layer element 43 are connected to one another.

In this case, the second surface 422 of the second layer element 42 and the first surface 441 of the fourth layer element 44 are connected to one another.

These connections just mentioned are in this case preferably formed in a material-bonded manner, such as, in particular, a welded manner and, for example, a laser-welded manner. Connections of this kind are intended to be indicated in FIG. 2 by the dashed lines.

For electrically conductive connection of the cell connector 1 to the connection terminal 2 of the battery cell, in the exemplary embodiment of the cell connector 1 shown in FIG. 1, the second surface 442 of the fourth layer element 44 is connected in a material-bonded manner to the connection terminal 2, wherein said connection is preferably formed in a welded and, in particular, a laser-welded manner.

Said connection is also intended to be indicated by the dashed line.

The first layer element 41, the second layer element 42, the third layer element 43 and the fourth layer element 44 are preferably formed from aluminum, wherein a design made from copper or nickel or also from a mixture of the three mentioned materials is also possible.

According to the exemplary embodiment shown in FIG. 2, the first layer element 41, the second layer element 42, the third layer element 43 and the fourth layer element 44 each have a thickness of 0.5 mm to 2 mm. At this point, a thickness of the respective layer element 41, 42, 43, 44 should be understood to mean the distance between the respective first surface 411, 421, 431, 441 and the respective second surface 421, 422, 432, 442.

As can further be seen from FIG. 2, the first layer element 41 has a first opening 51, which is formed to run continuously through the first layer element 41.

It can also further be seen from FIG. 2 that the third layer element 43 has a third opening 53, which is formed to run continuously through the third layer element 43.

Here, the first opening 51 and the third opening 53 form a joint opening 5, which is formed to run continuously through the first layer element 41 and the third layer element 43.

Here, the cell connector 1 is formed in such a way that the second layer element 42 limits the depth of the first opening 51.

According to the initial example of the cell connector 1 shown in FIG. 1, the second layer element 42 also limits the depth of the joint opening 5.

In particular, the first surface 421 of the second layer element 42 limits the depth of the first opening 51 or the joint opening 5.

At this point, it should be noted that the first opening 51 or the joint opening 5 is limited laterally by the first layer element 41 and also the third layer element 43 and, on the side at the bottom in FIG. 2, is limited by the second layer element 42 or the first surface 421 of the second layer element 42.

In this respect, it should furthermore be noted that the first opening 51 or the joint opening 5 on the side opposite the limitation by the second layer element 42 is open toward an environment 6 of the cell connector 1 in order to enable the penetration of a laser beam, for example.

At this point, it should be noted that, for a material-bonded connection of the cell connector 1 and the connection terminal 2, for example, a laser beam can penetrate in the direction 9 indicated into the opening 51 or the joint opening 5 and can connect the cell connector 1 to the connection terminal 2 in a material-bonded manner by way of energy input.

It should furthermore be noted that it is possible to form the first opening 51 or the joint opening 5 first and then to connect the individual respective layer elements 41, 42, 43, 44 to one another in a material-bonded manner or to connect the individual respective layer elements 41, 42, 43, 44 first and then to form the first opening 51 or the joint opening 5.

FIG. 3 shows a perspective illustration of a further embodiment of a cell connector 1 according to the invention.

It can be seen from FIG. 3 that the first connecting region 31 and the second connecting region 32 each have two first openings 51.

In particular, the first connecting region 31 and the second connecting region 32 each have two joint openings 5.

The cell connector 1 has a longitudinal direction 7 pointing from the first connecting region 31 to the second connecting region 32.

The first opening 51 or the joint opening 5 furthermore has a longitudinal direction 8, which points in the direction of the greatest extent of the first opening 51 or the joint opening 5.

As can be seen from FIG. 3, the longitudinal direction 8 of the first opening 51 or the joint opening 5 is arranged in parallel with the longitudinal direction 7 of the cell connector 1.

In particular, the longitudinal directions 8 of the two first openings 51 or the two joint openings 5 of the first connecting region 31 or of the second connecting region 32 are also arranged in parallel with one another.

The further embodiment of the cell connector 1 shown in FIG. 3 differs from the embodiment of the cell connector 1 shown in FIG. 1, in particular, only by the arrangement of the first openings 51 or the joint openings 5 with respect to one another.

An embodiment of the cell connector according to FIG. 3 offers the advantage, in particular, that a homogeneous distribution of the electric current flowing between the connection terminal 2 of the first battery cell and the connection terminal 2 of the second battery cell is possible.

At this point, it should generally be noted again that the second layer element 42 can also have an opening or recess, which is not, however, formed to be continuous through the second layer element 42. In such a case, said opening or recess is intended to be denoted as joint opening 5 together with the first opening 51 and the third opening 53, wherein, to this end, it is furthermore noted that the second layer element 42 also furthermore limits the depth of such a joint opening 5 or first opening 51.

The invention claimed is:

1. A cell connector of a battery module comprising
   a first connecting region (31) formed for electrically conductive connection to a connection terminal (2) of a first battery cell, and
   a second connecting region (32) formed for electrically conductive connection to a connection terminal (2) of a second battery cell, wherein
   the cell connector (1) has at least one first layer element (41) and one second layer element (42),
   second surface (412) of the first layer element (41) and a first surface (421) of the second layer element (42) are connected to one another,
   the first layer element (41) has a first first opening (51) and a second first opening (51), both formed to run continuously through the first layer element (41) and the second layer element (42) limits the depth of the first first opening (51) and the second first opening (51),
   the first first opening (51) is in the first connecting region (31) and the second first opening (51) is in the second connecting region (32), and
   the cell connector (1) has a longitudinal direction (7) pointing from the first connecting region (31) to the second connecting region (32), the first first opening (51) has a longitudinal direction (8) pointing in the direction of the greatest extent of the first first opening (51), the second first opening (51) has a longitudinal direction (8) pointing in the direction of the greatest extent of the second first opening (51), and the longitudinal direction (8) of the first first opening (51) and the longitudinal direction (8) of the second first opening (51) are arranged in parallel with the longitudinal direction (7) of the cell connector (1).

2. The cell connector according to claim 1, characterized in that
   the cell connector (1) furthermore has a third layer element (43), wherein
   a first surface (411) of the first layer element (41) and a second surface (432) of the third layer element (43) are connected to one another, wherein the third layer element (43) has a third opening (53) formed to run continuously through the third layer element (43), wherein the first first opening (51) and the third opening (53) form a joint opening (5) formed to run continuously through the first layer element (41) and the third layer element (43).

3. The cell connector according to claim 2, characterized in that
   the cell connector (1) furthermore has a fourth layer element (44), wherein
   a second surface (422) of the second layer element (42) and a first surface (441) of the fourth layer element (44) are connected to one another, and
   the fourth layer element (44) is configured to be connected in a material-bonded manner to the connection terminal (2) of the first battery cell and/or the connection terminal (2) of the second battery cell.

4. The cell connector according to claim 1, characterized in that
   the first layer element (41) and/or the second layer element (42) are formed from a material comprising aluminum, copper and/or nickel.

5. The cell connector according to claim 1, characterized in that
   the first layer element (41) and/or the second layer element (42) have a thickness of 0.5 mm to 2 mm and/or are formed as a sheet or as a film.

6. The cell connector according to claim 1, characterized in that
   the first layer element (41) and the second layer element (42) are connected in a material-bonded manner to one another.

7. A method for producing a cell connector (1) according to claim 1, the method comprising
   in a first method step, providing a first layer element (41) and a second layer element (42),
   then, in a second method step, connecting a second surface (412) of the first layer element (41) to a first surface (421) of the second layer element (42) to one another, and
   then, in a third method step, forming a first first opening (51) running continuously through the first layer element (41) in such a way that the second layer element (42) limits the depth of the first opening (51).

8. A method for producing a cell connector according to claim 1, the method comprising
   in a first method step, providing a first layer element (41) and a second layer element (42),
   then, in a second method step, forming a first first opening (51) running continuously through the first layer element (41), and
   then, in a third method step, connecting a second surface (412) of the first layer element (41) to a first surface (421) of the second layer element (42) to one another in such a way that the second layer element (42) limits the depth of the first opening (51).

9. A battery module comprising a cell connector (1) according to claim 1 and comprising
   the first battery cell comprising the connection terminal (2) of the first battery cell, and
   the second battery cell comprising the connection terminal (2) of the second battery cell, wherein the first connecting region (31) and the second connecting region (32) both include the first layer element (42) and the second layer element (42), the second layer element (42) in the first connecting region (31) of the cell connector (1) is electrically conductively connected in a material-bonded manner to the connection terminal (2) of the first battery cell, and the second layer element (42) in the second connecting region (32) of the cell connector (1) is electrically conductively connected in a material-bonded manner to the connection terminal (2) of the second battery cell.

10. A battery comprising a battery module according to claim 9.

11. The cell connector according to claim 1, characterized in that
the first layer element (41) and the second layer element (42) are connected in a welded manner to one another.

12. The cell connector according to claim 1, characterized in that
the first connecting region (31) and the second connecting region (32) both include the first layer element (42) and the second layer element (42), and
the first connecting region (31) and the second connecting region (32) each have two first openings (51).

13. The cell connector according to claim 1, characterized in that
the one of the first connecting region (31) and the second connecting region (32) includes an additional layer element (44), wherein
a second surface (422) of the second layer element (42) and a first surface (441) of the additional layer element (44) are connected to one another, and
the additional layer element (44) is configured to be connected in a material-bonded manner to the connection terminal (2) of the first battery cell and/or the connection terminal (2) of the second battery cell.

14. A battery module comprising a cell connector (1) according to claim 13 and comprising
one of the first battery cell and the second battery cell comprising the connection terminal (2) of the one of the first battery cell and the second battery cell, wherein
the additional layer element (44) is electrically conductively connected in a material bonded manner to the connection terminal (2) of the one of the first battery cell and the second battery cell.

15. A cell connector (1) of a battery module comprising
a first connecting region (31) formed for electrically conductive connection to a connection terminal (2) of a first battery cell, and
a second connecting region (32) formed for electrically conductive connection to a connection terminal (2) of a second battery cell, wherein
the cell connector (1) has at least one first layer element (41) and one second layer element (42), a second surface (412) of the first layer element (41) and a first surface (421) of the second layer element (42) are connected to one another, the first layer element (41) has a first first opening (51) and a second first opening (51) formed to run continuously through the first layer element (41) and the second layer element (42) limits the depth of the first first opening (51) and the second first opening (51), the first connecting region (31) and/or the second connecting region (32) has the first first opening (51) and the second first opening (51), the cell connector (1) has a longitudinal direction (7) pointing from the first connecting region (31) to the second connecting region (32), the first first opening (51) has a longitudinal direction pointing in the direction of the greatest extent of the first first opening (51), the second first opening (51) has a longitudinal direction pointing in the direction of the greatest extent of the second first opening (51), the longitudinal direction of the first first opening (51) is at a first angle to the longitudinal direction (7) of the cell connector (1) and the longitudinal direction of the second first opening (51) is at a second angle to the longitudinal direction (7) of the cell connector (1), the first angle is greater than zero degrees and less than ninety degrees and the second angle is greater than zero degrees and less than ninety degrees, and the longitudinal direction of the first first opening (51) crosses the longitudinal direction of the second first opening (51) such that the first first opening (51) and the second first opening (51) form a V-shape.

16. The cell connector (1) according to claim 15, wherein the longitudinal direction (7) of the cell connector (1) extends through the center of the cell connector (1), wherein the first layer element (41) has a third first opening (51) and a fourth first opening (51) formed to run continuously through the first layer element (41) and the second layer element (42) limits the depth of the third first opening (51) and the fourth first opening (51), wherein the third first opening (51) is substantially collinear with the first first opening (51) and the fourth first opening (51) is substantially collinear with the second first opening (51), and wherein the longitudinal direction of the first first opening (51) intersects with the longitudinal direction of the second first opening (51) approximately at the longitudinal direction (7) of the cell connector (1).

17. The cell connector (1) according to claim 15, wherein the first angle and the second angle are greater than 20 degrees and less than 70 degrees.

18. The cell connector (1) according to claim 15, wherein the first angle is equal to the second angle.

* * * * *